United States Patent
Hayes et al.

(10) Patent No.: US 7,171,422 B2
(45) Date of Patent: Jan. 30, 2007

(54) CACHING SYSTEM FOR NESTED ARCHIVES

(75) Inventors: David Hayes, Dublin (IE); Gary Tully, Dublin (IE)

(73) Assignee: Iona Technologies, Dublin (IE)

( * ) Notice: Subject to any disclaimer, the term of this patent is extended or adjusted under 35 U.S.C. 154(b) by 426 days.

(21) Appl. No.: 10/162,176

(22) Filed: Jun. 3, 2002

(65) Prior Publication Data

US 2003/0018614 A1    Jan. 23, 2003

Related U.S. Application Data

(60) Provisional application No. 60/295,353, filed on Jun. 2, 2001.

(51) Int. Cl.
*G06F 17/30* (2006.01)

(52) U.S. Cl. ..................................................... 707/102

(58) Field of Classification Search .................... 707/1, 707/7, 10, 103, 204, 102
See application file for complete search history.

(56) References Cited

U.S. PATENT DOCUMENTS 5,966,702 A * 10/1999 Fresko et al. .................. 707/1
6,336,122 B1 * 1/2002 Lee et al. ..................... 707/204
6,851,058 B1 * 2/2005 Gartside ...................... 726/24

* cited by examiner

*Primary Examiner*—Jeffrey Gaffin
*Assistant Examiner*—Haythim Alaubaidi
(74) *Attorney, Agent, or Firm*—Lacasse & Associates, LLC; Randy W. Lacasse; Ramraj Soundararajan

(57) ABSTRACT

A representation of nested electronic data archives permitting archived resources to be efficiently accessed during use is disclosed. A method and system is disclosed which selectively expands and efficiently stores the contents of an archive during use. In a preferred embodiment, the system comprises a nested associative data structure to store compressed and uncompressed portions of a nested archive.

7 Claims, 5 Drawing Sheets

```
fooApp.ear

|
    |-----> fooEjbJar.jar
    |
    |-----> fooWeb.war
              |
              |-----> fooWebLib.jar
              |
              |-----> fooWebResources.jar
```

JarMap

| Key | Value |
|---|---|
| a.jar | Byte array for a.jar |

JarMap

Hash Map for a.jar

| Key | Value |
|---|---|
| a.jar |  |

| Key | Value |
|---|---|
| b.jar | Byte array for b.jar |
| a.class | C |

CACHING SYSTEM FOR NESTED ARCHIVES

This application claims the benefit of Provisional Application 60/295,353, filed Jun. 2, 2001.

FIELD OF INVENTION

The field of the present invention pertains generally to electronic data packaged in archives and more specifically to an efficient way to access resources stored in nested Java Archives (JARs).

BACKGROUND OF THE INVENTION

Electronic data resources are often stored in archive data structures or files Archives may be expanded to retrieve the original contents. Archives are often compressed to save memory space. Compressed archives must be both decompressed and expanded to retrieve the original contents. Archives are often nested so that lower-level archives are contained in upper-level archives. A common approach to access archives is to search through layers of nested archives, expanding and decompressing each archive layer if necessary. As a result, archives are often decompressed, expanded and searched repeatedly in use. This repetitive decompression, expansion and searching is time-consuming and may hinder the speedy execution of computer programs making use of archives.

One common type of archive file is a Java Archive file (JAR). Java provides a standard computer programming language and runtime environment. In this environment applications are composed of cooperating Java classes. Java classes are typically organized into packages and stored in JAR files. A typical Java program uses classes from multiple packages stored in multiple JARs. When the program is executed, the classes that the program requires must be extracted from the JARs that contain them and loaded into memory. Java archives provide a compressed archive format which requires decompressing on access. Repeated access to the same JAR requires repeated decompressing. When an application requires many different JARs the task can be very expensive in terms of resource usage.

The access of archived Java classes becomes more complex with the introduction of nested archives in Java 2 Enterprise Edition (J2EE) applications. J2EE applications comprise multiple modules of different types. Each module consists of a resource used by the application, such as Java byte code class files, image files (e.g. gif), property files, HTML or XML files. Each module is packaged as a Java archive file. A variety of types of Java archives exist, such as WAR (web application), EjbJar (ejb code), and others. Certain module types in J2EE allow for the nesting of other module archives within their own structure. The top level J2EE application archive (EAR) is an example. It maintains a nested archive for each of the modules that it contains. In the same way WARs may contain multiple utility archives.

In the example nested structure schematically shown in FIG. 1, in order to locate a file named picture.gif in fooWebResources.jar, the archive fooApp.ear needs to be decompressed to access fooWeb.war which must be decompressed to access fooWebResource.jar which can then be searched for the picture.gif file.

Another problem of accessing nested archives is that some systems do not support searching archives at an arbitrary nesting level. For example, a file associated with a Java application can be located from the archives using a uniform resource locator (URL). A URL for picture.gif could look as follows:

"jar:/fooApp.ear!/fooWeb.war!/fooWebResources.jar!/picture.gif"

However, using the existing jar protocol handler in JDK1.3 accessing the above URL will result in an exception of the form:

"java.io.FileNotFoundException: JAR entry fooWeb.war!/fooWebResources.jar!/picture.gif not found in fooApp.ear"

The exception occurs because although the JDK1.3 protocol handler supports accessing entries within a jar using the "!/" notation, it cannot locate entries within jars at an arbitrary nesting level.

There are many solutions to the restriction on the current Java JAR protocol handler. One solution is to expand all archives containing nested archives to a file system and mapping JAR entries to file system locations. The existing JAR protocol handler can then be used to access entries within JARs. An alternative solution is to expand archives to the local file system, eliminating use of the JAR protocol handler. These solutions all require a preliminary procedure that expands required archives before an application is executed and this preliminary expansion is undesirable and can be expensive in terms of memory usage.

SUMMARY OF THE INVENTION

It is therefore one objective of the present invention to provide a representation of nested archives so that archived files can be efficiently accessed during use. In one aspect, the present invention comprises a method and system which selectively expands and/or decompresses and efficiently stores the contents of an archive during use. In a preferred embodiment, the system comprises a nested associative data structure to store compressed and uncompressed portions of a nested archive.

BRIEF DESCRIPTION OF THE DRAWINGS

These and other features, aspects and advantages of the presentation invention will become better understood with regard to the following descriptions, appended claims and accompanying drawing in which:

DESCRIPTION OF THE PREFERRED EMBODIMENTS

Figure 1:
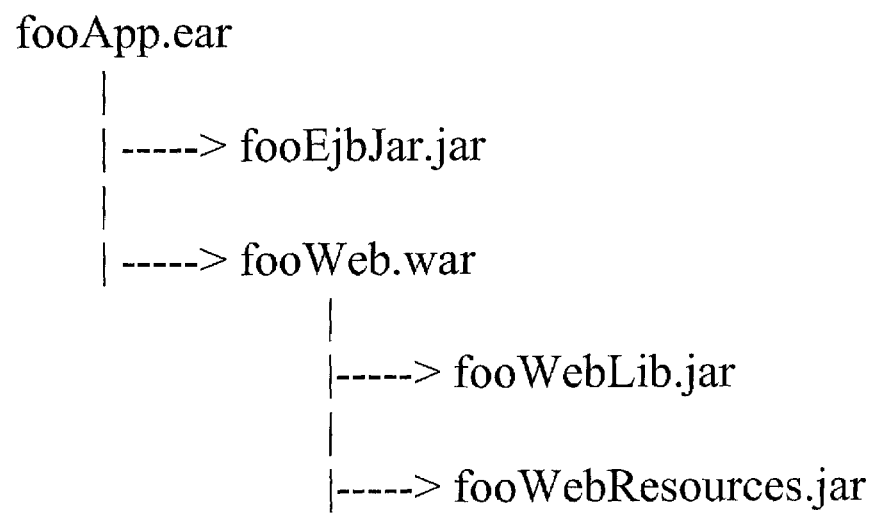
FIG. 1 schematically illustrates the structure of an example nested archive.

In one preferred embodiment, the present invention comprises a method and system which selectively expands and/or decompresses and efficiently stores the contents of an archive during use. In a preferred embodiment, the system comprises a nested associative data structure to store compressed and uncompressed portions of a nested archive. As used here, associative data structure means any data structure for storing name-value pairs and retrieving the value of a name-value pair using the name.

In one preferred embodiment, the associative data structure is a hash table (also referred to here as a hash map), preferably one or more instances of the Java class java.util.HashMap. The keys in each hash map are portions of the full names of archived resources. The values in each hash map are either byte arrays comprising a resource or archive, or hash maps comprising lower-level archives. The first time a (possibly nested) archive is accessed, the archive is stored in its parent map as a byte array. If the system searches into the nested archive, the system reads the byte array, decompresses the archive, and populates a new map to represent the decompressed archive. Once complete, the system removes the original byte array from the parent map and replaces it with the map for the newly expanded archive. The system also maintains a top-level map whose keys are the full names of the expanded archives and whose values are the expanded maps of these archives. The top-level map also optionally includes entries whose keys are the full names of resources that have been decompressed and whose values are pointers to the resources.

To access a resource, the system preferably iterates over the full name of the resource, isolating segments of successively increasing length. If a name segment is not in the map, the system has not yet populated a map for the archive associated with the name segment. If the archive associated with the name segment is the top-level archive, the system reads it from disk and populates a map with the contents of the top-level archive. If the archive is a nested archive then the system accesses the map representing the parent archive and retrieves the byte array representing the nested archive. The byte array representing the nested archive is then decompressed and a new hash map is populated with the contents of the nested archive. The system then replaces the byte array representing the nested archive in the parent hash map with the newly populated map. As will be understood by those of skill in the field, data structures may contain data or other data structures either directly, or by storing a reference or pointer to the data or data structure. Both approaches are within the scope of the present invention.

The system repeats this process for archives corresponding to successively longer name segments until a map representing the nested archive containing the resource to be accessed has been populated. The resource is then retrieved from the map using the resource name as a key. For each archive that is expanded and represented by a hash map, a new entry is inserted in the top-level map of the system using the full name of the archive as the key and the new map representing the archive (or a pointer or reference thereto) as the value. Using this method, resources can be retrieved directly from the top-level map if they are requested again. Significant performance advantages result from this invention because maps are built dynamically as resources are accessed, and resources can be subsequently loaded directly from the top-level map without repetitive search and expansion.

Figure 2:
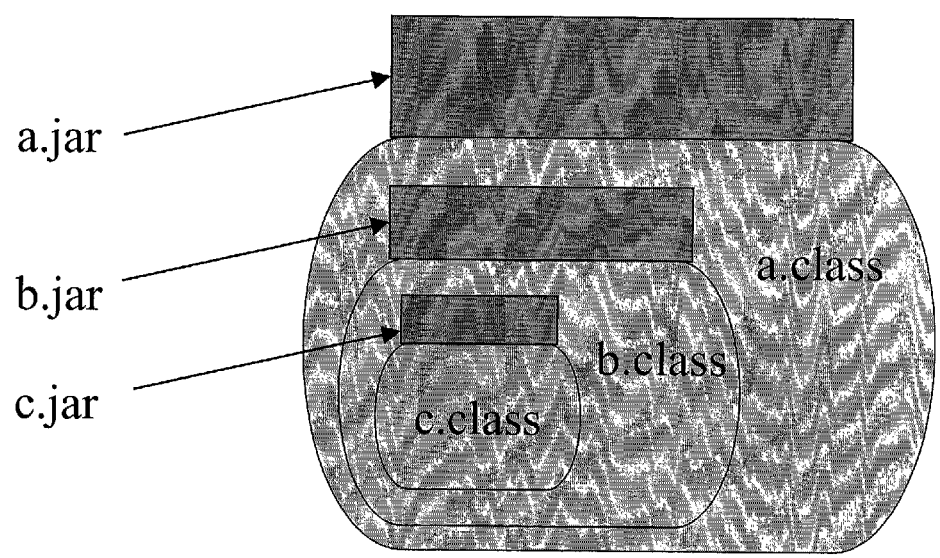
FIG. 2 schematically illustrates an example nested JAR.

The present system and method is illustrated by the following example using Java archives. An example nested JAR is schematically illustrated in FIG. 2. This archive consists of three layers of classes and archives. The archive a.jar is the highest level consisting of archive b.jar and resource a.class. The archive b.jar further consists of archive c.jar and resource b.class. The archive c.jar contains only the resource c.class. One possible URL for c.class of FIG. 2 is "jadx:file:a.jar!/b.jar!/c.jar/c.class". Access of c.class using one preferred embodiment of the present invention is described below.

Figures 3A, 3B:
FIG. 3*a* schematically illustrates a caching structure before the top level JAR in FIG. 2 is expanded.
FIG. 3*b* schematically illustrates a caching structure after the top level JAR in FIG. 2 is expanded.

FIG. 3a schematically illustrates the state of the example preferred system after a top-level hash map "JarMap" has been created, and the unexpanded archive a.jar has been stored as byte code in JarMap corresponding to the key "a.jar". The maps in the example are preferably implemented as instances of java.util.HashMap.

To access the resource c.class, the example URL "jadx:file:a.jar!/b.jar!/c.jar/c.class" for c.class is parsed, and the system iterates over the URL to isolate segments of increasing length. The first JAR of the URL fragment "a.jar!/b.jar!/c.jar" is a.jar and it is looked up in the JarMap using the string "a.jar" as the key. The fact that a byte array is associated with "a.jar" in JarMap indicates that the archive a.jar is stored in the byte array and has not been expanded. The byte array is retrieved and the a.jar archive is expanded. A new new hash map is instantiated for a.jar, and the contents of ajar are stored in the new hash map. The byte array associated with key "a.jar" in JarMap is then replaced with the new hash map for a.jar. The contents of a.jar are then accessible from JarMap by accessing the hash map for a.jar.

FIG. 3b schematically depicts the JarMap structure after a.jar is expanded. At this stage JarMap contains a single entry with "a.jar" as the key and the hash map for ajar as the value. There are two entries in the hash map representation of a.jar: the resource a.class and the byte array representing archive b.jar. The resource a.class can be retrieved using the string "a.class" as a key to the hash map representation of ajar, and the byte array representing b.jar can be retrieved using a key named "b.jar".

The first time the key "b.jar" is used to access the hash map representing a.jar, the byte array representing b.jar is returned. The byte array is expanded, and a new hash map is instantiated and populated with the contents of b.jar. The byte array in the hash map representing b.jar is then replaced with the new hash map for b.jar and a new entry is inserted in JarMap having a value comprising the hash map for b.jar and a key of "a.jar!/b.jar". The resource b.class can then be accessed by first locating the hash map associated with key "a.jar!/b.jar!/" in JarMap and then retrieving the value associated with the key "b.class" in that hash map.

Figure 4:
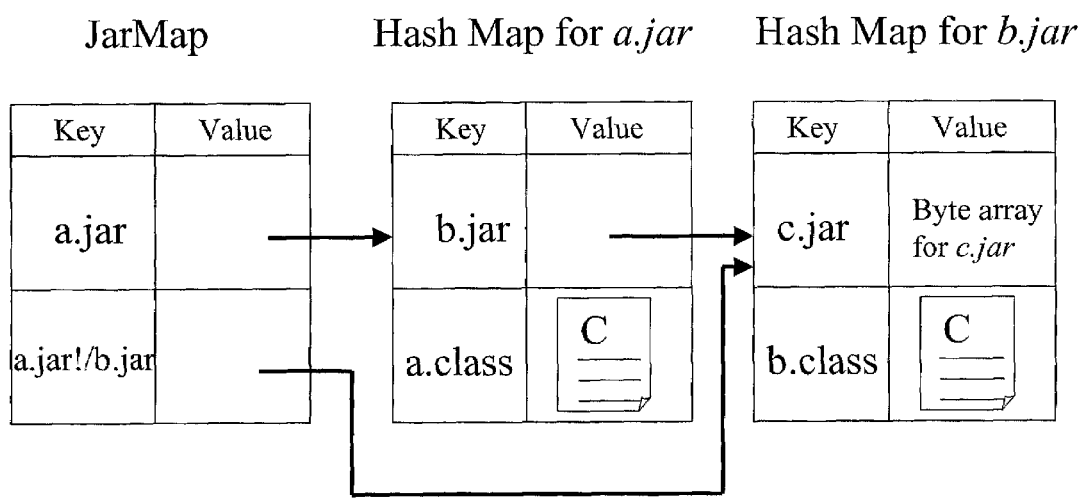
FIG. 4 schematically illustrates a caching structure after the second level JAR in FIG. 2 is expanded.

FIG. 4 depicts the structure of the hash maps after b.jar has been expanded and represented as a hash map. The byte array for b.jar in the hash map for ajar has been replaced with the hash map representation of b.jar. The hash map for b.jar contains the resource b.class and a byte array representing the archive c.jar. A new entry has been created in JarMap using "a.jar!/b.jar" as the key and the hash map for b.jar as the value.

Figure 5:
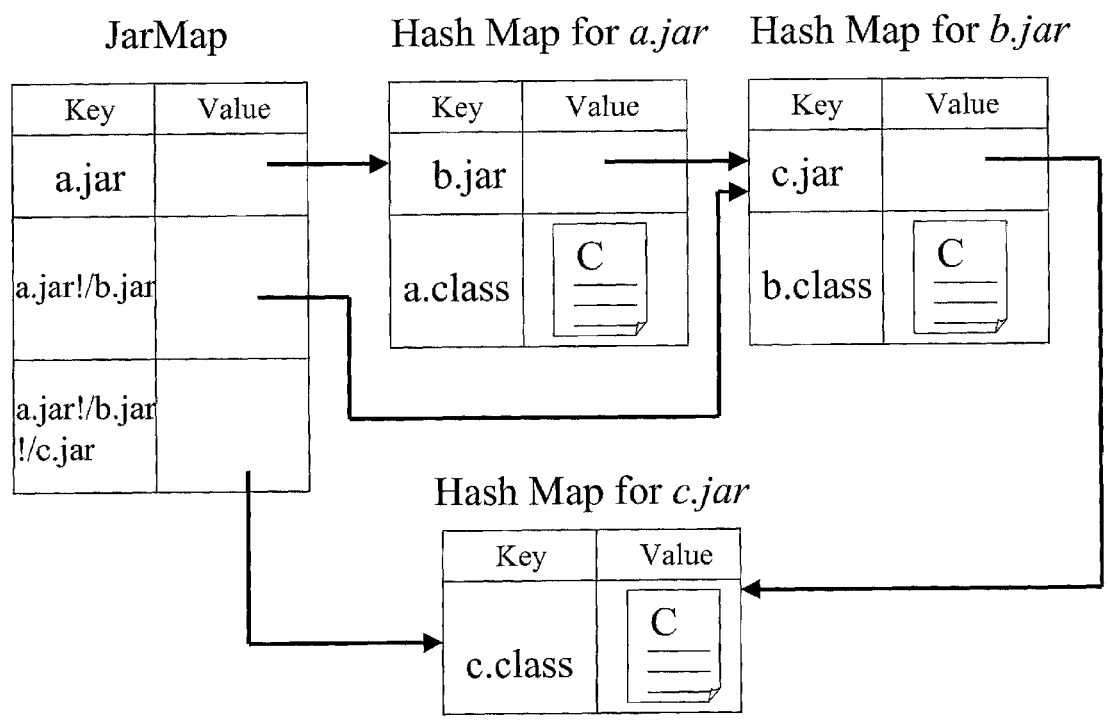
FIG. 5 demonstrates schematically illustrates a caching structure after all the JARs in FIG. 2 are expanded.

When the byte array representing c.jar is first accessed, the process described above is repeated, resulting in the configuration schematically depicted in FIG. 5. The byte array representing c.jar is represented as a hash map, and the hash map is associated with the key "a.jar!/b.jar!/c.jar" in JarMap and with the key "c.jar" in the hash map representing b.jar. The resource c.class may be retrieved by looking up the hash map associated with key "a.jar!/b.jar!/c.jar" in JarMap and then looking up the value associated with key "c.class" in the hash map.

The process may be repeated for jars nested to arbitrary levels and successive access to jars that are already loaded can be accessed by only two hash map look-ups, one to locate the enclosing jar and one to locate the actual resource inside the JAR.

In the preferred embodiment, the top level hash map (JarMap) includes entries to hash maps representing contents of archives, thereby making the repeated look-ups for resources from the same archives fast. Individual archived are expanded dynamically on first access. Archive that are never accessed are never expanded. This reduces memory usage. In addition, resources that will not be used again may be removed from the hash maps, and empty hash maps may also be discarded.

Although in one aspect, and in the preferred embodiment, the invention is directed to Java archives, in other aspects, the invention can be applied to retrieve any form of data stored in any type of nested archives, whether compressed or not compressed.

What is claimed is:

1. A method for caching nested archives, comprising the steps of: generating a first associative data structure;
   in the first associative data structure, associating data representing an unexpanded archive with a string representing the name of the archive;
   accessing the unexpanded archive using the name of the archive and the first associative data structure;
   expanding the archive;
   generating a second associative data structure;
   in the second associative data structure, associating one or more resources contained in the archive with one or more names of the one or more resources;
   in the first associative data structure, associating data representing the second associative data structure with the string representing the name of the archive; and
   wherein, for each expanded archive in said nested archive that is represented as a new associative data structure, a new entry is inserted in said first associative data structure using a name of the new archive as a key and a pointer or reference to the new archive as a value.

2. The method of claim 1, wherein the data representing an unexpanded archive comprises a pointer to an archive file.

3. The method of claim 1, wherein the data representing the second associative data structure comprises an object reference to the second associative data structure.

4. The method of claim 1, wherein the unexpanded archive comprises a Java jar.

5. The method of claim 1, wherein the unexpanded archive comprises a tape archive.

6. A method for caching nested archives comprising the steps of:
   storing data representing an unexpanded nested archive in a top-level hash map;
   expanding the unexpanded nested archive the first time a resource contained within the unexpanded nested archive is accessed; and
   replacing the data representing the unexpanded nested archive in the top-level hash map with data representing at least one expanded portion of the archive; and
   for each new archive that is expanded and represented by a new hash map, inserting a new entry in said top-level hash map using a name of the new expanded archive as a key and a pointer or reference to said new hash map.

7. The method of claim 1, wherein the resource name is an URL.

* * * * *

UNITED STATES PATENT AND TRADEMARK OFFICE
CERTIFICATE OF CORRECTION

PATENT NO.         : 7,171,422 B2                                            Page 1 of 1
APPLICATION NO.    : 10/162176
DATED              : January 30, 2007
INVENTOR(S)        : Hayes et al.

It is certified that error appears in the above-identified patent and that said Letters Patent is hereby corrected as shown below:

Column 3
Line 64, "ajar" should read --a.jar--.

Column 4
Line 20, "ajar" should read --a.jar--.
Line 27, "ajar" should read --a.jar--.
Line 32, "ajar" should read --a.jar--.
Line 47, "ajar" should read --a.jar--.

Signed and Sealed this

Fifth Day of June, 2007

JON W. DUDAS
*Director of the United States Patent and Trademark Office*